United States Patent Office 3,661,942
Patented May 9, 1972

3,661,942
NOVEL CHEMICAL PROCESS
Verlan H. Van Rheenen, Portage, Mich., assignor to The Upjohn Company, Kalamazoo, Mich.
No Drawing. Continuation-in-part of application Ser. No. 651,130, July 5, 1967. This application Sept. 8, 1969, Ser. No. 856,217
Int. Cl. C07c 167/00
U.S. Cl. 260—397.3
10 Claims

ABSTRACT OF THE DISCLOSURE

This invention is the discovery that copper salts catalyze the oxygenation of enamines to product useful products of oxidative cleavage, including oxidative decarbonylation, and/or diketone formation, depending on the structure of the enamine.

CROSS REFERENCES TO RELATION APPLICATION

This application is a continuation-in-part of application Ser. No. 651,130, filed July 5, 1967 now abandoned.

BRIEF DESCRIPTION OF THE INVENTION

An enamine (I) is converted into a ketone (II) and amide (III) by treatment with oxygen in the presence of catalytic amounts of copper salt.

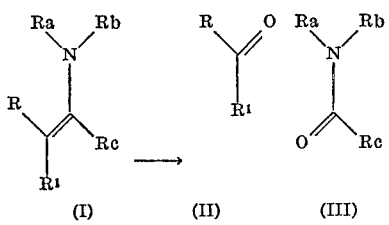

(I)         (II)         (III)

wherein

R=alkyl or aryl.
R$^1$=alkyl, aryl, the residue of a steroid nucleus, or together with R is polymethylene of 4 to 6 carbon atoms.
Ra and Rb=lower alkyl, aralkyl and (together) cyclic polymethylene containing 4 to 7 carbon atoms and which can contain 1 hetero oxygen atom or 1 hetero nitrogen atom.
Rc=hydrogen, lower alkyl, aralkyl or (together with R$^1$) is polymethylene of 3 to 5 carbon atoms and methyl substituted polymethylene of 3 to 5 carbon atoms.

Particular enamines having the structure (IV) are converted into the diketone (VI) or are oxidatively cleaved to produce an aldehyde or an amide, wherein R$^1$, Rc, Ra and Rb are as defined above.

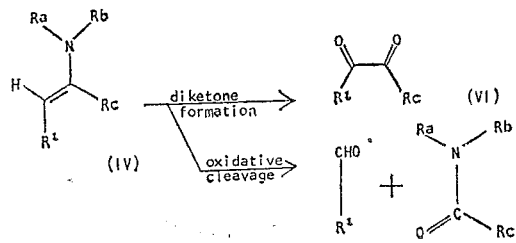

An enamine of structure V is oxidized to 6-keto steroids of structure VII.

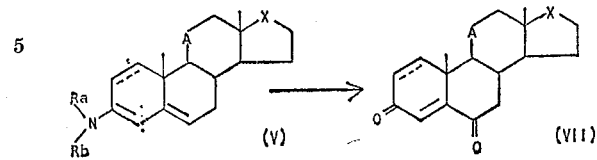

wherein

A=methylene, hydromethylene, or carbonyl.
X=carbonyl,

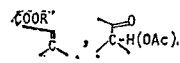

R=hydrogen or lower alkyl.
Ra and Rb=as defined above.
═══=single or double bond at $C_1$–$C_2$.

Treatment of an enamine with molecular oxygen in the presence of catalytic amounts of copper salts results in oxidation, giving products varying with the structure of the enamine. An efficient and selective reaction occurs with enamines containing alkyl or aryl groups (R and R$^1$) on the doubly bonded carbon beta ($\beta$) to the nitrogen function, e.g.,

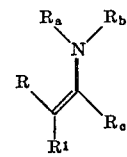

As can be seen from the following examples only oxidative cleavage to a ketone and an amide occurs in these cases. Thus, enamines from $\alpha$-disubstituted aldehydes undergo selective oxidative decarbonylation; for example, 3-keto-bisnor-4-cholen-22-al morpholine enamine:

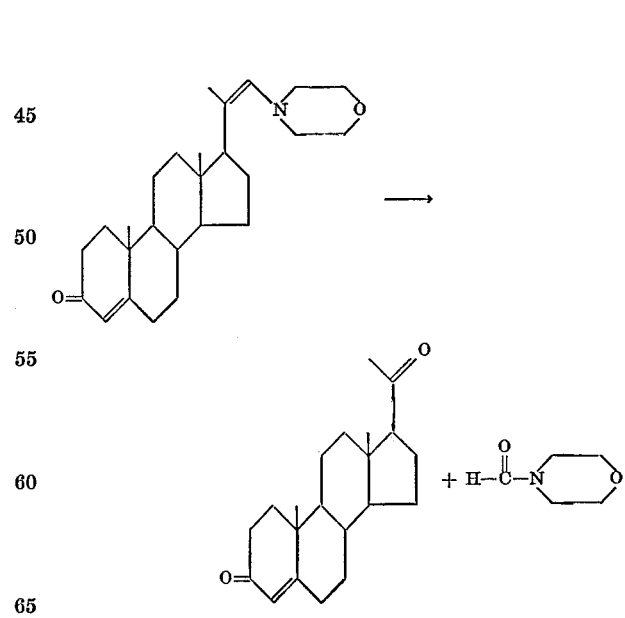

gives progesterone and 4-formylmorpholine in roughly quantitative yield. Likewise, isobutyraldehyde morpholine enamine gives acetone and 4-formylmorpholine cyclohexyl carboxyaldehyde morpholine enamine give cyclohexanone and 4-formylmorpholine. The reactions are essentially quantitative.

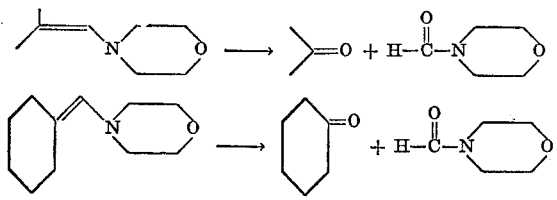

Enamines derived from α-disubstituted ketones react similarly, as is shown by cuprous chloride catalyzed oxygenation of the dimethylamine enamine of diisopropyl ketone. Here, as before, oxidative cleavage occurs to give acetone and N,N-dimethyl isobutyramide as the only products.

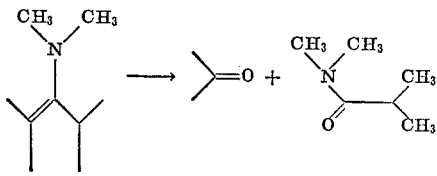

The high yields obtained in these reactions make it synthetically important for production of either the ketone or the amide.

When the enamine contains an α-vinyl hydrogen the oxygenation is complicated by two possible reaction pathways—oxidative cleavage and diketone formation. The relative amounts of cleavage and diketone formation for a given enamine varies with the structure. For example, deoxybenzoin pyrrolidine enamine on oxygenation gives predominantly benzil and minor amounts of the cleavage products benzaldehyde and 1-benzoylpyrrolidine.

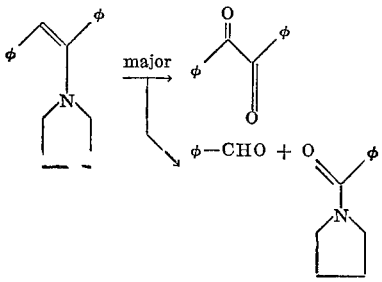

The similar enamine, 1,3-diphenylpropane-2-one 2-pyrrolidine enamine, however, gives predominantely cleavage to benzaldehyde and 1-(phenylacetyl)pyrrolidine.

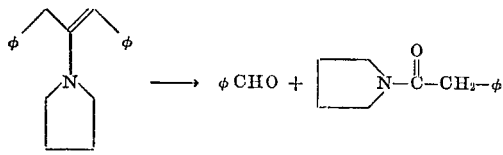

In the case of dienamines, such as those formed from α,β-unsaturated ketones, though there is some evidence of the α-diketone and cleavage products, the major products, is the γ-diketone. Thus:

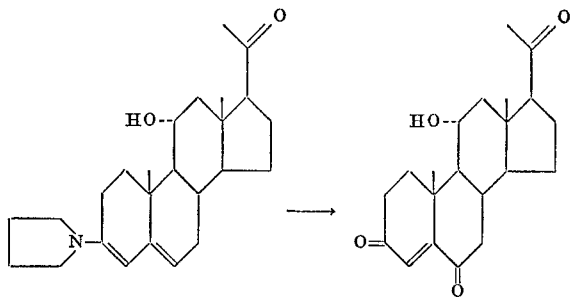

Enamines derived from α-disubstituted aldehydes and ketones undergo copper catalyzed autoxidative cleavage to give a ketone and an amide in approximately quantitative yield. Oxygenation of enamines containing an α-vinyl hydrogen also give rise to valuable products from oxidative cleavage and diketone formation.

The reaction has been found to be highly specific for the enamine function. Other functional groups in the molecule such as ketone, enol ether and hydroxyl are not affected under the reaction conditions.

In all the oxygenation steps, oxygen or an oxygen-containing gas such as air can be used.

The products from the reaction types illustrated above are useful per se or as intermediates, for example, in the production of biologically active steroids.

DETAILED DESCRIPTION OF THE INVENTION

A brief description of each of the reaction parameters follows:

(1) Catalyst.—The preferred copper catalyst is cuprous chloride.

Other copper salts (i.e., cuprous bromide, cuprous cyanide, cupric chloride and cupric bromide) also work but are found to result in some side product formation which lowers the yield of desired product to a small degree (as a rather extreme example, the yield of progesterone is reduced from nearly quantitative with cuprous chloride to as low as 75% with cupric bromide). Cupric nitrate $$[Cu(NO_3)_2 \cdot 3H_2O]$$

and cupric acetate promote the reaction at a slower rate, and the former is accompanied by the formation of some side products.

(2) Solvent.—The solvent does not appear to be a critical factor in the reaction. Two solvents we have used with consistent success are the very polar DMF and the relatively non-plar methylene chloride. Factors to be considered in choosing a solvent are the solubility of enamine and copper catalyst (only trace solubility necessary), stability of the enamine (not stable in water and only moderately so in alcohols) and flammability of the solvent.

(3) Temperature.—Not critical between freezing and reflux, but we have found temperatures between 0° to 30° to be effective.

EXPERIMENTAL—EXAMPLE 1

Oxygenation of 3-ketobisnor-4-cholen-22-al

To 150 ml. of dimethylformamide (DMF) is added 4.0 g. of 4-ketobisnor-4-cholen-22-al morpholine enamine. Cuprous chloride (0.25 g.) is added and oxygen is bubbled through the reaction for 30 minutes at room temperature. The reaction mixture is poured into water and extracted with methylene chloride. The methylene chloride layer is dried and by quantitative vapor phase chromatography is shown to contain 3.02 g. (95.3%) of progesterone.

Evaporation and crystallization gives progesterone:
M.P.=127–129° C.
$[\alpha]_D = 176°$.

EXAMPLE 2

Oxygenation of 3-ketobisnor-4-cholen-22-al morpholine enamine

To 40 ml. of dry methylene chloride is added 0.2 g. of cuprous chloride. The mixture is cooled to +6° C., and 3.0 g. of 3-ketobisnor-4-cholen-22-al morpholine enamine is added followed by introduction of oxygen. After a 15 minute induction period the solution becomes green and oxygen is absorbed. The reaction is complete after one hour at +6° C. This mixture is passed through a bed of silica gel, evaporated and crystallized to give 2.4 g. (84%) of white crystalline progesterone. A 250 mg. second crop is obtained after filtration.

EXAMPLE 3

Oxygenation of isobutyraldehyde morpholine enamine

To 40 ml. of dry methylene chloride is added 0.25 g. of cuprous chloride and 5 ml. of isobutyraldehyde morpholine enamine. The solution is cooled to 5° C. and oxygen is passed through for 2¼ hours. The reaction mixture is passed through a short bed of silica gel, and NMR and VPC of the eluate clearly shows the presence of acetone. Evaporation of the acetone and methylene chloride reveals 2.6 g. of 4-formylmorpholine.

B.P.=229–232° 745 mm.
NMR=484 c.p.s. (1H), 216 c.p.s. (8H).

EXAMPLE 4

Oxygenation of diisopropyl ketone dimethylamine enamine

To 25 ml. of dry methylene chloride is added 0.05 g. cuprous chloride and 1 ml. of the dimethyl enamine of diisopropyl ketone. Oxygen is introduced for 1.5 hours at a reaction temperature of 5° C. The NMR after reaction shows only two products in a ratio of 1:1-acetone [126 c.p.s. (6H)] and N,N-dimethyl isobutyramide [61 c.p.s. (6H) c.p.s. (6H) $J$=6.5 c.p.s., 168 c.p.s. (1H), 176 c.p.s. (6H) $J$=6 c.p.s.]. Evaporation of the solvent and acetone gives the amide.

EXAMPLE 5

Oxygenation of the pyrrolidine enamine of desoxybenzoin

To 25 ml. of methylene chloride is added 14.3 g. of desoxybenzoin pyrrolidine enamine and 4.0 g. of cuprous chloride. The solution is cooled to ice bath temperature, and oxygen is introduced over a two hour reaction period. Besides a small quantity of unreacted enamine and desoxybenzoin, three products are found and characterized by NMR, VPC and by comparison with authentic samples. The major product (about 60%) is benzil and two minor products (about 15%) form in equal amounts, benzaldehyde and 1-benzoylpyrrolidine.

EXAMPLE 6

Oxygenation of 11α-hydroxyprogesterone pyrrolidine enamine

To 150 ml. of dry methylene chloride is added 0.1 g. cuprous chloride and 9.0 g. of 11α-hydroxyprogesterone pyrrolidine enamine. The solution is oxygenated for 4 hours at a temperature of 0–10° C.

The reaction mixture is chromatographed over silica gel to give 4.1 g. of material which is crystallized to give 6-keto-11α-hydroxyprogesterone:
M.P.=158–159° C.

$\lambda_{max.}^{EtOH}$=250 m$\mu$ (10,500)

Calcd. (percent): C, 73.22; H, 8.19. Found (percent): C, 73.07; H, 8.12.

EXAMPLE 7

Oxygenation of 3-(diethylamino)-11-oxo pregna-1,3,5-cis-17(20)-tetraen-21-oic acid, methyl ester To 150 ml. of dry $CH_2Cl_2$ is added 0.1 g. of cuprous chloride and 7.0 g. of 3-(diethylamino)-11-oxo pregna-1,2,5,cis-17(20)-tetraen-21-oic acid, methyl ester. The mixture is cooled to 0° C. and oxygen is slowly passed through the solution for 7 hours. The reaction mixture is washed with dilute NaOH, HCl and water. The residue obtained on drying and evaporation of the organic phase is chromatographed on silica gel giving the major product, 3,6,11-trioxo pregna-1,4,cis - 17(20) - trien - 21 - oic acid, methyl ester, M.P. 196–198°; m/e 368, and the minor product, 1α,2α - oxido-3,6-dioxo-pregna-4,cis-17(20)-dien-21-oic acid, methyl ester, M.P. 217–219°; m/e 384.

EXAMPLE 8

Oxygenation of progesterone-3-pyrrolidine enamine

To 100 ml. of dry chloroform is added 0.1 g. cuprous chloride and 5.0 g. of progesterone-3-pyrrolidine enamine. This mixture is cooled to 0° and oxygen is bubbled through the solution for 3½ hours. The solution is washed with NaOH, HCl and water, and crystallization of the residue obtained on evaporation of the solvent yields 6-oxo-progesterone, M.P. 178–188° C.; m/e 228.

EXAMPLE 9

Oxygenation of the piperidine enamine of androst-4-en-3,11,17-trione

Passing oxygen through 5.0 g. of the piperidine enamine of androst-4-en-3,11,17-trione and 0.1 g. cuprous cyanide in 80 ml. of hexamethtylphosphoramide for 4 hours followed by precipitation with water and crystallization yields androst-4-en-3,6,11,17-tetrone.

EXAMPLE 10

Oxidation of cyclohexane carboxaldehyde morpholine enamine

Oxidation of cyclohexane carboxaldehyde morpholine enamine with oxygen in the presence of cuprous chloride in accordance with the foregoing examples produces cyclohexanone and 4-formyl morpholine.

EXAMPLE 11

Oxidation of N,N,2,5-tetramethyl-1-cyclopenten-1-ylamine

Oxidation of N,N,2,5-tetramethyl-1-cyclopenten-1-ylamine with oxygen in the presence of cuprous chloride in accordance with the foregoing examples produces 5-oxo-N,N,2-trimethylhexanamide.

EXAMPLE 12

Oxidation of 1-(1-phenyl-2-methylpropenyl)pyrrolidine

Oxidation of 1-(phenyl-2-methylpropenyl) pyrrolidine with oxygen in the presence of cuprous chloride in accordance with the foregoing examples produces pyrrolidine benzamide and acetone.

EXAMPLE 13

Oxidation of 4-(3-methyl-2-buten-2yl)morpholine

Oxidation of 4-(3-methyl-2-buten-2yl) morpholine with oxygen in the presence of cuprous chloride in accordance with the foregoing examples produces 4-acetyl morpholine and acetone.

EXAMPLE 14

Oxidation of 1-(N-methylanilino)-2-methyl-1-cyclohexene

Oxidation of 1-(N-methylanilino)-2-methyl-1-cyclohexene with oxygen in the presence of cuprous chloride in accordance with the foregoing examples produces 6-oxo-N-methyl-N-phenylheptanamide.

EXAMPLE 15

Oxidation of 1(2,5-dimethyl-1-pyrrolidinyl)-2-methyl-1-cyclohexene

Oxidation of 1(2,5-dimethyl-1-pyrrolidinyl)-2-methyl-2-cyclohexene with oxygen in the presence of cuprous chloride in accordance with the foregoing examples produces 2,5-dimethyl-1-(6-oxoheptanoyl)pyrrolidine.

EXAMPLE 16

Oxidation of 1,3-diphenyl propane-2-one 2-pyrrolidine enamine

Oxidation of 1,3-diphenyl propane-2-one 2-pyrrolidine enamine with oxygen in the presence of cuprous chloride in accordance with the foregoing examples produces benzaldehyde and 1-(phenylacetyl)pyrrolidine.

EXAMPLE 17

Oxidation of 2-methyl-3-penanone morpholline enamine

Oxidation of 2-methyl-3-penanone morpholine enamine with oxygen in the presence of cuprous chloride in accordance with the foregoing examples produces acetaldehyde, isobutyryl morpholine and 4-methyl-2,3-pentanedione.

EXAMPLE 18

Oxidation of 6-methyl-1-morpholine cyclohexene

Oxidation of 6-methyl-1-morpholine cyclohexene with oxygen in the presence of cuprous chloride in accordance with the foregoing examples produces 3-methyl cyclohexane-1,2-dione and 2-methyl-6-al-hexanoyl morpholine.

What is claimed is:

1. Process for oxidative cleavage of an enamide I into a ketone II and amide III which comprises treating the said enamine with oxygen in the presence of catalytic amounts of a copper salt according to the following equation:

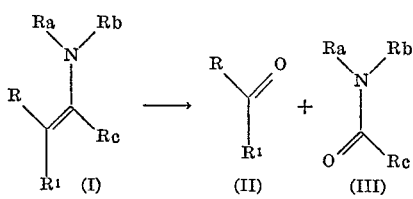

wherein
R=alkyl or aryl;
$R^1$=alkyl, aryl, the residue of a steroid nucleus, or together with R is polymethylene of 4 to 6 carbon atoms;
Ra and Rb=lower alkyl, aralkyl and (together) cyclic polymethylene containing 4 to 7 carbon atoms and which can contain 1 hetero oxygen atom,
Rc=hydrogen, lower alkyl, aralkyl (or together with $R^1$) is polymethylene of 3 to 5 carbon atoms and methyl substituted polymethylene of 3 to 5 carbon atoms.

2. Process which comprises treating an enamine of Formula IV with oxygen in the presence of catalytic amounts of a copper salt to give a diketone VI and oxidative cleavage to an aldehyde and an amide according to the following equation:

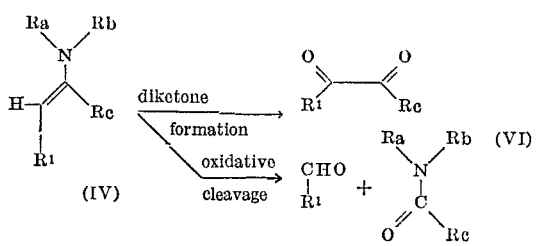

wherein
$R^1$=alkyl, aryl, or the residue of a steroid nucleus;
Ra and Rb=lower alkyl, aralkyl and (together) cyclic polymethylene containing 4 to 7 carbon atoms and which can contain 1 hetero oxygen atom or 1 hetero nitrogen atom;
Rc=hydrogen, lower alkyl, aralkyl (or together with $R^1$) is polymethylene of 3 to 5 carbon atoms and methyl substituted polymethylene of 3 to 5 carbon atoms.

3. Process which comprises oxidizing an enamine of Formula V with oxygen in the presence of catalytic amounts of a copper salt to give a 6-keto product VII in accordance with the following equation:

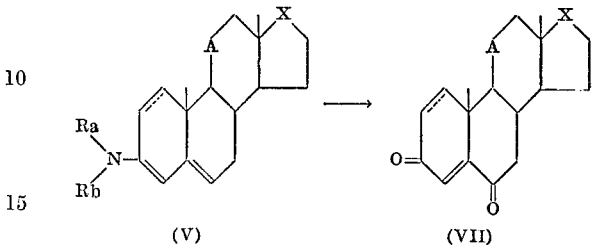

wherein
Ra and Rb=lower alkyl, aralkyl and (together) cyclic polymethylene containing 4 to 7 carbon atoms and which can contain 1 hetero oxygen atom or 1 hetero nitrogen atom;
A=methylene, hydroxymethylene, or carbonyl;
X=carbonyl,

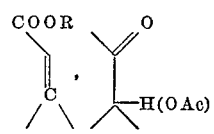

R=hydrogen or lower alkyl,
———=single or double bond at $C_1$–$C_2$.

4. Process which comprises oxidizing a 3-ketobisnor-4-cholen-22-al enamine of the formula:

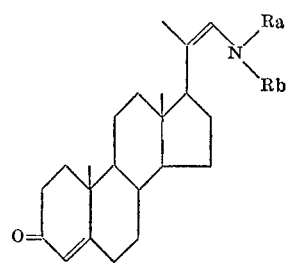

wherein
Ra and Rb=lower alkyl, aralkyl and (together) cyclic polymethylene containing 4 to 7 carbon atoms and which can contain 1 hetero oxygen atom or 1 hetero nitrogen atom;
with oxygen in the presence of catalytic amounts of a copper salt to give progesterone.

5. Process of claim 3 where the catalyst is cuprous chloride.

6. Process of reacting the enamine compound of claim 1 with oxygen in the presence of catalytic amounts of cuprous chloride in an inert reaction medium and recovering from the reaction mixture the products of oxidative cleavage.

7. Process of reacting the enamine compound of claim 2 with oxygen in the presence of catalytic amounts of cuprous chloride in an inert reaction medium and recovering from the reaction mixture the products of oxidative cleavage.

8. Process of reacting the enamine compound of claim 3 with oxygen in the presence of catalytic amounts of cuprous chloride in an inert reaction medium and recovering from the reaction mixture the products of oxidative cleavage.

9. Process of reacting the enamine compound of claim 4 with oxygen in the presence of catalytic amounts of cuprous chloride in an inert reaction medium and recovering progesterone from the reaction mixture.

10. Process of claim 9, wherein the enamine is 3-keto-bisnor-4-cholen-22-al morpholine enamine.

References Cited

UNITED STATES PATENTS 3,496,197  2/1970  Van Rheenen _____ 260—397.3

ELBERT L. ROBERTS, Primary Examiner

U.S. Cl. X.R.

260—397.3, 397.1, 397.4, 397.45

UNITED STATES PATENT OFFICE
CERTIFICATE OF CORRECTION

Patent No. 3,661,942            Dated May 9, 1972

Inventor(s) Verlan H. VanRheenen

It is certified that error appears in the above-identified patent and that said Letters Patent are hereby corrected as shown below:

Column 4, line 47, for "22-al" read -- 22-al morpholine enamine --. Column 5, line 65, for "1,2,5,cis-" read -- 1,3,5, cis- --. Column 6, line 40, for "1-(phenyl" read -- 1-(1-phenyl --. Column 7, line 19, for "enamide" read -- enamine --.

Signed and sealed this 9th day of January 1973.

(SEAL)
Attest:

EDWARD M. FLETCHER, JR.         ROBERT GOTTSCHALK
Attesting Officer                Commissioner of Patents